(12) United States Patent
Hiraoka et al.

(10) Patent No.: US 8,462,411 B2
(45) Date of Patent: Jun. 11, 2013

(54) OPTICAL REFLECTION ELEMENT WITH DRIVE AND MONITOR ELEMENTS SEPARATED BY A SEPARATION GROOVE

(75) Inventors: Soichiro Hiraoka, Hyogo (JP); Jirou Terada, Osaka (JP); Shinsuke Nakazono, Osaka (JP); Shigeo Furukawa, Osaka (JP); Kiyomi Furukawa, legal representative, Osaka (JP)

(73) Assignee: Panasonic Corporation, Osaka (JP)

( * ) Notice: Subject to any disclaimer, the term of this patent is extended or adjusted under 35 U.S.C. 154(b) by 186 days.

(21) Appl. No.: 13/130,150

(22) PCT Filed: Nov. 18, 2009

(86) PCT No.: PCT/JP2009/006190
§ 371 (c)(1),
(2), (4) Date: Jun. 20, 2011

(87) PCT Pub. No.: WO2010/058565
PCT Pub. Date: May 27, 2010

(65) Prior Publication Data
US 2011/0292479 A1   Dec. 1, 2011

(30) Foreign Application Priority Data
Nov. 20, 2008   (JP) .................. 2008-296354

(51) Int. Cl.
 G02B 26/08   (2006.01)
 G02B 26/10   (2006.01)
 G02B 26/12   (2006.01)
(52) U.S. Cl.
 USPC ............ 359/199.4; 359/200.7; 310/311
(58) Field of Classification Search
 None
 See application file for complete search history.

(56) References Cited

U.S. PATENT DOCUMENTS

| 7,550,766 | B2 * | 6/2009 | Ahn et al. ................. 257/59 |
| 8,139,280 | B2 * | 3/2012 | Wu .......................... 359/224.1 |
| 8,379,283 | B2 * | 2/2013 | Klose et al. .............. 359/224.1 |
| 2006/0245023 | A1 | 11/2006 | Akedo et al. |
| 2008/0143450 | A1 * | 6/2008 | Matsumoto et al. |

FOREIGN PATENT DOCUMENTS

| JP | 2006-293116 A | 10/2006 |
| JP | 2006-320089 A | 11/2006 |
| JP | 2008-040240 A | 2/2008 |

OTHER PUBLICATIONS

International Search Report for PCT/JP2009/006190, Dec. 5, 2009, Panasonic Corp.
Masanao Tani et al., "An Image Display Using Piezoelectric MEMS Optical Scanner", Laser Review, Apr. 15, 2008, vol. 36, No. 4, pp. 183 to 189.

\* cited by examiner

*Primary Examiner* — Stephone Allen
*Assistant Examiner* — Jyotsna Dabbi
(74) *Attorney, Agent, or Firm* — RatnerPrestia (57) ABSTRACT

An optical reflection element includes a mirror portion and an oscillator coupled to the mirror portion. The oscillator includes a base, an insulating layer, a drive element, and a monitor element. The insulating layer is formed on the base. The drive element and the monitor element are formed on the insulating layer, and are separated from each other by a separation groove. Each of the drive element and the monitor element includes a lower electrode layer, a piezoelectric layer, and an upper electrode layer formed in that order on the insulating layer. The monitor element has high detection accuracy, allowing the optical reflection element to perform self-excited driving with high accuracy.

9 Claims, 7 Drawing Sheets

OPTICAL REFLECTION ELEMENT WITH DRIVE AND MONITOR ELEMENTS SEPARATED BY A SEPARATION GROOVE

This application is a U.S. National Phase Application of PCT international application PCT/JP2009/006190.

TECHNICAL FIELD

The present invention relates to an optical reflection element used in display and other devices.

BACKGROUND ART

Figure 10:
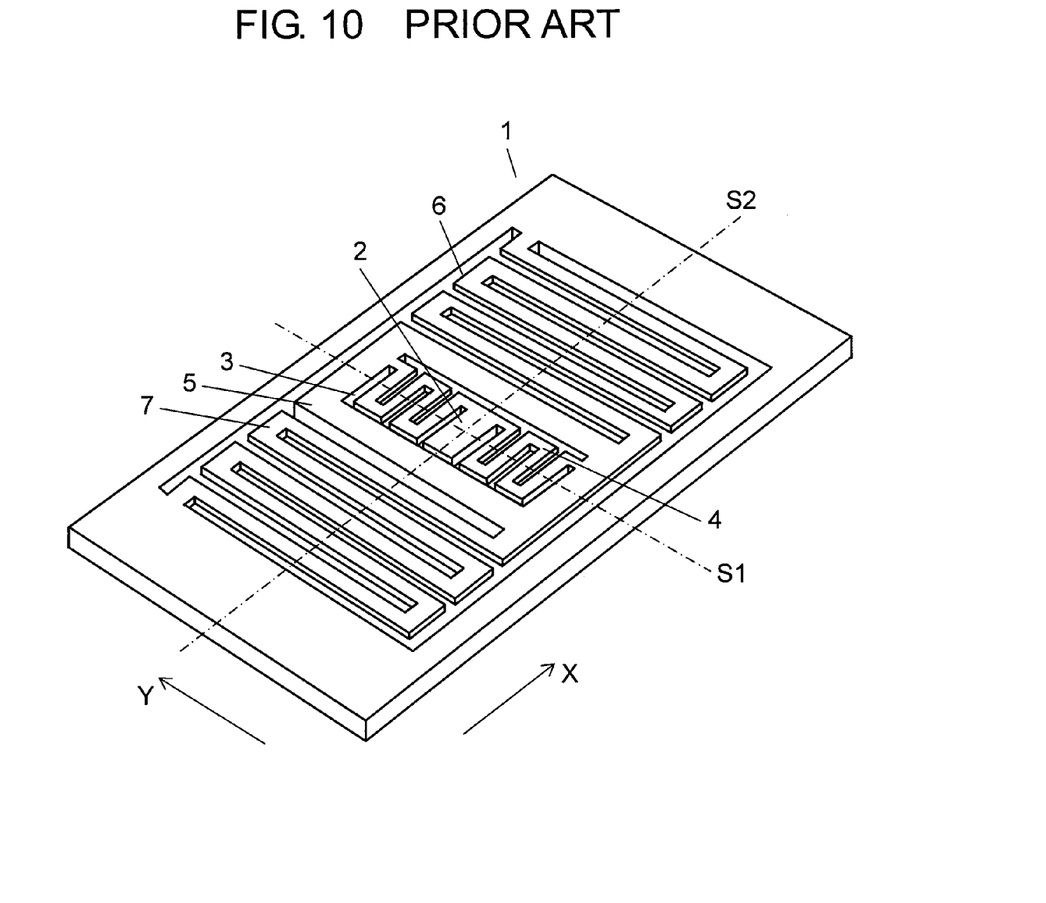
FIG. 10 is a perspective view of a conventional optical reflection element.

FIG. 10 shows conventional optical reflection element 1. Optical reflection element 1 includes mirror portion 2, a pair of first oscillators 3 and 4, frame body 5, and a pair of second oscillators 6 and 7. First oscillators 3 and 4 are coupled to the ends of mirror portion 2. Frame body 5 is coupled to first oscillators 3 and 4, and surrounds the outer peripheries of first oscillators 3, 4 and mirror portion 2. Second oscillators 6 and 7 are coupled to the ends of frame body 5.

First oscillators 3 and 4 have an axis S1 as their central axis, which is parallel to the y-axis. Second oscillators 6 and 7 have an axis S2 as their central axis, which is parallel to the x-axis. Thus, first oscillators 3, 4 and second oscillators 6, 7 are formed in a meandering shape.

First oscillators 3, 4 and second oscillators 6, 7 include a drive element. The drive element is composed of a lower electrode layer, a piezoelectric layer, and an upper electrode layer. By applying voltage to the drive element, mirror portion 2 rotates about axes S1 and S2. Then, by applying light to mirror portion 2 while it is rotating, the x-y surface of a screen can be scanned with reflected light. As a result, an image can be projected onto a wall, a screen, or the like.

First oscillators 3, 4, second oscillators 6, 7, and mirror portion 2 also include a monitor element. The monitor element is also composed of a lower electrode layer, a piezoelectric layer, and an upper electrode layer. The monitor element detects an electrical signal, and supplies the signal to the upper electrode layer of the drive element via a feedback circuit. As a result, in theory, optical reflection element 1 can be driven constantly at the resonant frequency, thereby having a large amplitude. Such optical reflection elements are referred to as self-excited driving type.

An example of a conventional technique related to the present invention is shown in Patent Literature 1.

In this example, however, when the driving frequency is too high, the optical reflection element sometimes cannot perform self-excited driving.

The reason for this is considered as follows. Arranging a ground electrode lengthwise increases the resistance. The increased resistance causes current leakage between the upper electrode layer of the monitor element and the upper electrode layer of the drive element adjacent to the monitor element.

This decreases the detection accuracy of the monitor element, making is impossible for the optical reflection element to perform self-excited driving.

CITATION LIST

Patent Literature

Patent Literature 1: Japanese Patent Unexamined Publication No. 2008-040240

SUMMARY OF THE INVENTION

An object of the present invention is to provide an optical reflection element having a monitor element with high detection accuracy, thereby performing self-excited driving with high accuracy.

The optical reflection element of the present invention includes a mirror portion, and an oscillator coupled to the mirror portion. The oscillator includes a base, an insulating layer, a drive element, and a monitor element. The insulating layer is formed on the base. The drive element and the monitor element are formed on the insulating layer, and are separated from each other by a separation groove. Each of the drive element and the monitor element includes a lower electrode layer, a piezoelectric layer, and an upper electrode layer formed in that order on the insulating layer. The lower electrode layer of the drive element and the lower electrode layer of the monitor element are connected to the same external electrode. The separation groove allows the shortest conductive path between an arbitrary point of the lower electrode layer of the monitor element and an arbitrary point of the lower electrode layer of the drive element adjacent to the monitor element to be set to be longer than the distance from the arbitrary point of the lower electrode layer of the monitor element to the external electrode.

The optical reflection element of the present invention has a monitor element with high detection accuracy, thereby performing self-excited driving with high accuracy.

More specifically, the ground resistance of the lower electrode of the monitor element can be made lower than the conductive resistance between the lower electrode of the monitor element and the lower electrode of the drive element.

This structure can prevent current leakage between the upper electrode layer of the monitor element and the upper electrode layer of the drive element even when the lower electrode layer is arranged lengthwise.

As a result, the monitor element has high detection accuracy, allowing the optical reflection element to perform self-excited driving with high accuracy.

DETAILED DESCRIPTION OF PREFERRED EMBODIMENT

First Exemplary Embodiment

Figure 1:
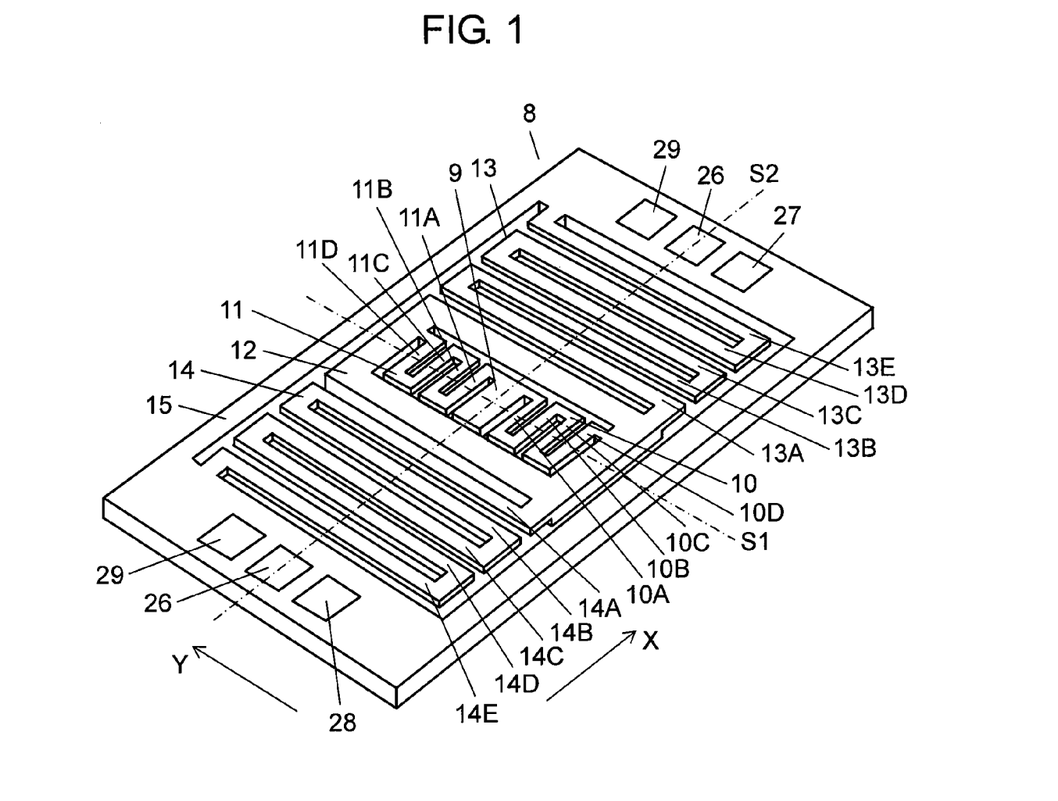
FIG. 1 is a perspective view of an optical reflection element according to a first exemplary embodiment of the present invention.
Figure 2A:
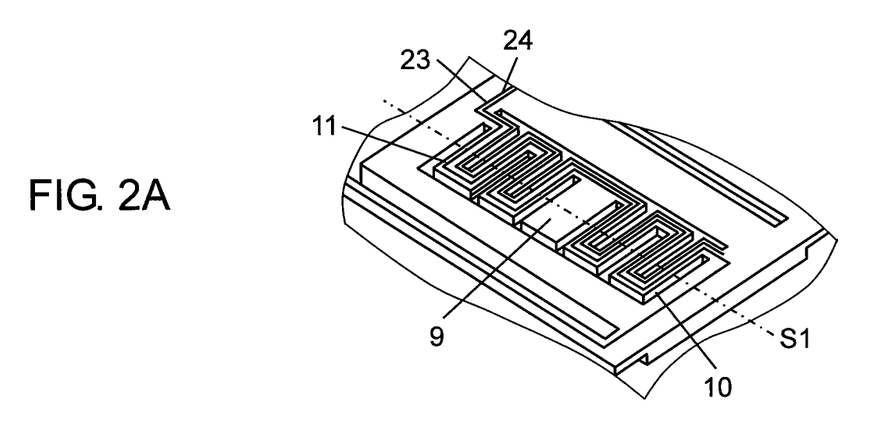
FIG. 2A is a perspective view of first oscillators in the optical reflection element according to the first exemplary embodiment.
Figure 2B:
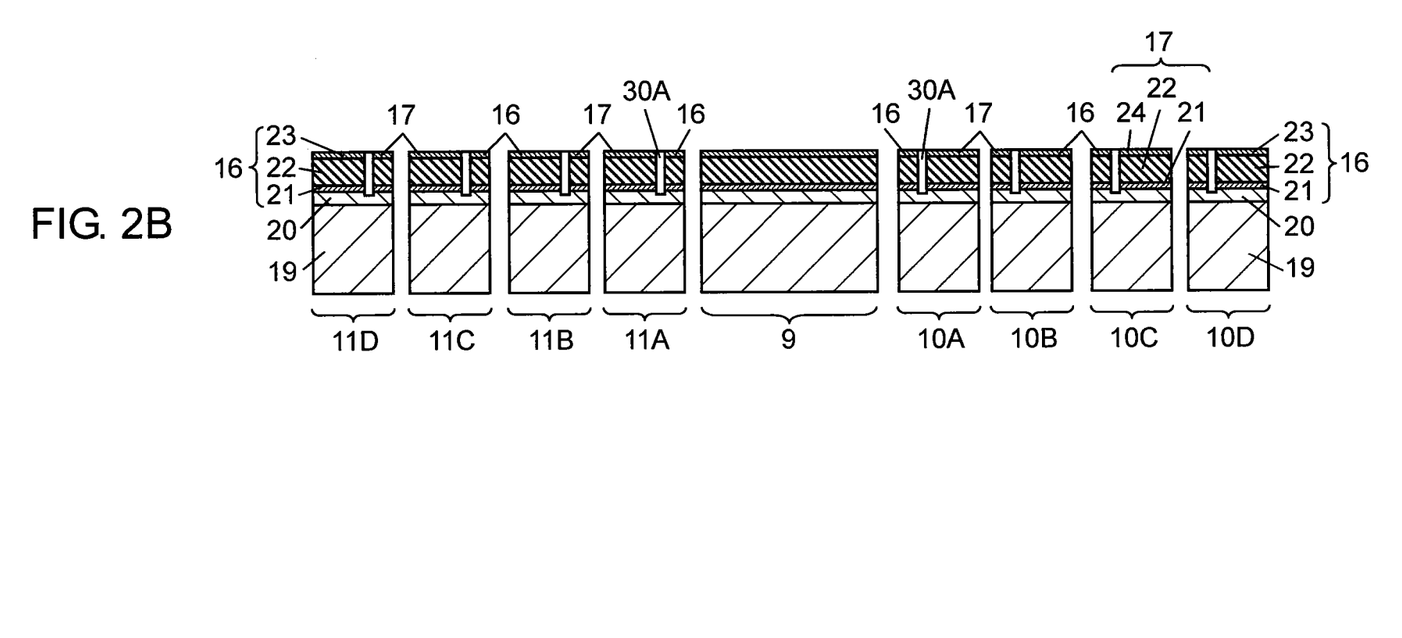
FIG. 2B is a sectional view (taken along an axis S1 of FIG. 2A) of the first oscillators in the optical reflection element according to the first exemplary embodiment.
Figure 3:
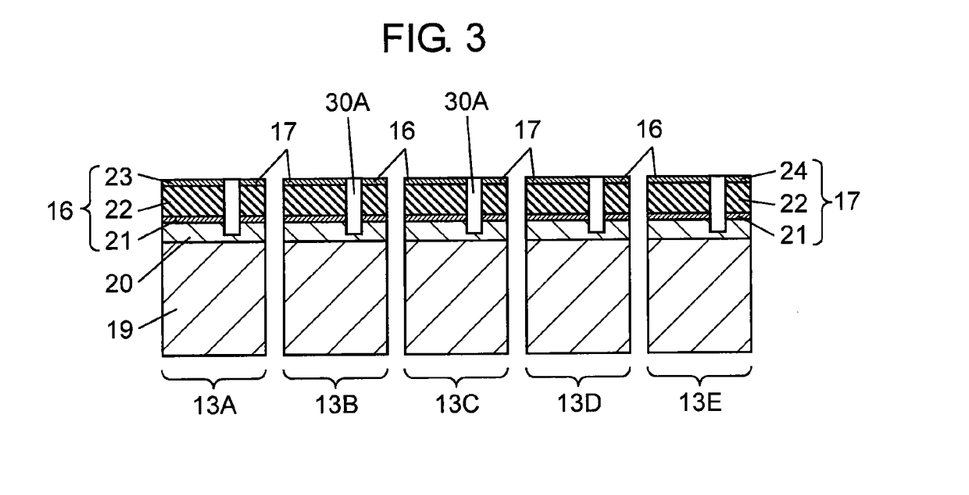
FIG. 3 is a sectional view (taken along an axis S2 of FIG. 1) of one second oscillator in the optical reflection element according to the first exemplary embodiment.
Figure 4:
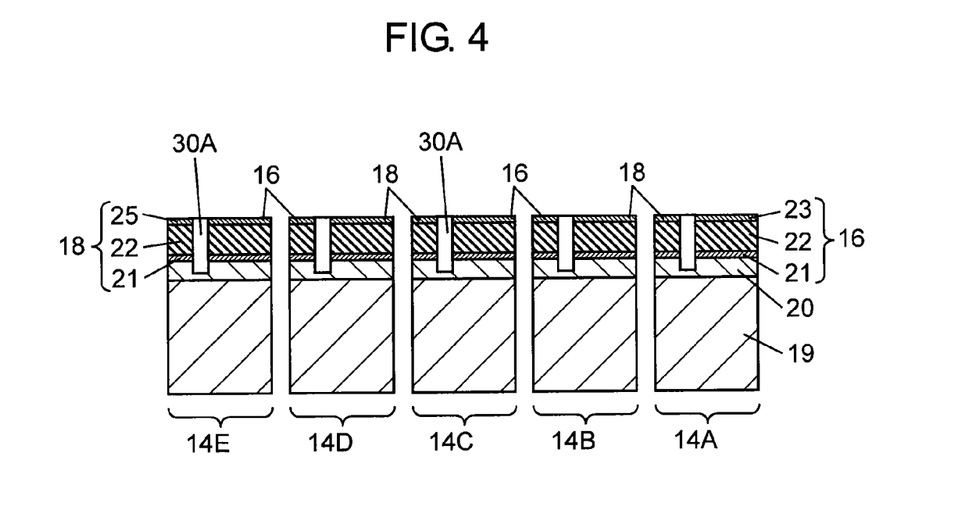
FIG. 4 is a sectional view (taken along the axis S2 of FIG. 1) of the other second oscillator in the optical reflection element according to the first exemplary embodiment.

The structure of an optical reflection element of the present exemplary embodiment will be described as follows with reference to FIGS. 1 to 4. FIG. 1 is a perspective view of the optical reflection element. FIGS. 2A and 2B are a perspective view and a sectional view, respectively, of first oscillators in the optical reflection element. FIGS. 3 and 4 are sectional views of one second oscillator and the other second oscillator, respectively, in the optical reflection element.

In FIG. 1, optical reflection element 8 of the present exemplary embodiment includes mirror portion 9 and a pair of first oscillators 10 and 11. First oscillators 10 and 11 are opposed to each other in the y-axis direction with mirror portion 9 therebetween, and are coupled to the ends of mirror portion 9. Optical reflection element 8 further includes frame body 12. Frame body 12 is coupled to first oscillators 10 and 11, and surrounds the outer peripheries of first oscillators 10, 11 and mirror portion 9. Optical reflection element 8 further includes a pair of second oscillators 13 and 14, and frame-like support body 15. Second oscillators 13 and 14 are opposed to each other in the x-axis direction with frame body 12 therebetween, and are coupled to frame body 12. Support body 15 is coupled to second oscillators 13 and 14, and surrounds the outer peripheries of second oscillators 13, 14 and frame body 12. First oscillators 10 and 11 are arranged at right angles to second oscillators 13 and 14.

First oscillators 10 and 11 have a resonant driving frequency different from second oscillators 13 and 14. The frequency difference between them is about 10 to 100 times. In the present exemplary embodiment, first oscillators 10 and 11 have a resonant frequency of 10 kHz, and second oscillators 13 and 14 have a resonant frequency of about 200 Hz.

The central axis S1 of first oscillators 10, 11 and the central axis S2 of second oscillators 13, 14 cross each other. In the present exemplary embodiment, these axes S1 and S2 cross at the center of gravity of mirror portion 9. First oscillators 10 and 11 are symmetrical with respect to central axis S2 of second oscillators 13 and 14. Second oscillators 13 and 14 are symmetrical with respect to central axis S1 of first oscillators 10 and 11.

First oscillators 10 and 11 in the present exemplary embodiment include oscillating plates 10A to 10D and 11A to 11D, and are formed in a meandering shape. Oscillating plates 10A to 10D and 11A to 11D are folded and coupled to each other in parallel with the x-axis (perpendicular to the central axis S1) on the same plane. Second oscillators 13 and 14 include oscillating plates 13A to 13E and 14A to 14E, and are formed in a meandering shape. Oscillating plates 13A to 13E and 14A to 14E are folded and coupled to each other in parallel with the y-axis (perpendicular to the central axis S2) on the same plane.

FIG. 2B is a sectional view of first oscillators taken along the central axis S1. In FIG. 2B, oscillating plates 10A to 10D and 11A to 11D composing first oscillators 10 and 11 include drive element 16 and monitor element 17 on their top portion.

FIG. 3 shows a sectional view of second oscillator 13 taken along the central axis S2. In FIG. 3, oscillating plates 13A to 13E composing second oscillator 13 include drive element 16 and monitor element 17. Drive element 16 is shared among first and second oscillators 10, 11, 13, and 14. Monitor element 17 detects the oscillation of first oscillators 10 and 11.

FIG. 4 is a sectional view of second oscillator 14 taken along the central axis S2. In FIG. 4, oscillating plates 14A to 14E composing second oscillator 14 include drive element 16 and monitor element 18. Drive element 16 is shared among first and second oscillators 10, 11, 13, and 14. Monitor element 18 detects the oscillation of second oscillator 14.

As shown in FIGS. 2B, 3, and 4, each of first oscillators 10, 11 and second oscillator 13 includes base 19, insulating layer 20, drive element 16, and monitor element 17. Insulating layer 20 is formed on base 19. Drive element 16 and monitor element 17 are formed on insulating layer 20, and are separated from each other by separation groove 30A. Second oscillator 14 includes base 19, insulating layer 20, drive element 16, and monitor element 18. Insulating layer 20 is formed on base 19. Drive element 16 and monitor element 18 are formed on insulating layer 20, and are separated from each other by separation groove 30A.

Drive element 16 includes lower electrode layer 21, piezoelectric layer 22, and upper electrode layer 23 formed on insulating layer 20 in that order.

Similarly, monitor element 17 includes lower electrode layer 21, piezoelectric layer 22, and upper electrode layer 24 formed on insulating layer 20 in that order. Monitor element 18 includes lower electrode layer 21, piezoelectric layer 22, and upper electrode layer 25 formed on insulating layer 20 in that order.

In the present exemplary embodiment, in FIG. 1, upper electrode layer 23 of drive element 16 at the top portion of each of first oscillators 10, 11 and second oscillators 13, 14 is connected to interconnect electrode 26 formed on support body 15. Upper electrode layer 24 of monitor element 17 (see FIG. 2B) at the top portion of each of first oscillators 10 and 11 is connected to interconnect electrode 27 via upper electrode layer 24 of second oscillator 13. Upper electrode layer 25 of monitor element 18 (see FIG. 4) at the top portion of second oscillator 14 is connected to interconnect electrode 28. Lower electrode layers 21 of drive element 16 and of monitor elements 17 and 18 shown in FIGS. 2B, 3, and 4 are connected to the same interconnect electrode 29 shown in FIG. 1.

Support body 15 includes an external electrode layer (not illustrated). The external electrode layer is connected to the lower electrode layers of drive element 16 and of monitor elements 17, 18, and is also connected to interconnect electrode 29.

In FIGS. 2A, 2B, 3, and 4, drive element 16 and monitor element 17 or 18 are parallelly arranged adjacent to each other at the top portion of each of oscillating plates 10A to 10D, 11A to 11D, 13A to 13E, and 14A to 14E. More specifically, in each oscillating plate, drive element 16 and monitor element 17 or 18 are arranged on the same insulating layer 20 formed on the same base 19, and are separated from each other by separation groove 30A.

Separation groove 30A reaches insulating layer 20 so that its bottom surface is located inside insulating layer 20.

In the present exemplary embodiment, base 19 is made of a silicon wafer, but may alternatively be made of, for example, a MgO or stainless wafer.

Insulating layer 20 can be made of silicon dioxide. Lower electrode layer 21 can be made of platinum. Upper electrode layers 23, 24, and 25 can be made of gold. Piezoelectric layer 22 can be made of lead zirconate titanate ($Pb(Zr_x Ti_{1-x})O_3$ where x=0.525). These materials can be formed into thin films by deposition, sol-gel, CVD, sputtering, or other methods.

Separation groove 30A can be formed by patterning upper electrode layers 23, 24, and 25 by dry etching, wet etching, or other methods, and then by patterning piezoelectric layer 22, lower electrode layer 21, and insulating layer 20 in that order by dry etching. However, in the case that lower electrode layer 21 is made of platinum and insulating layer 20 is made of silicon dioxide, it is difficult to locate the bottom surface of separation groove 30A inside insulating layer 20. This is because silicon dioxide is etched at a higher rate than platinum. Therefore, the thickness ratio of insulating layer 20 to lower electrode layer 21 is preferably larger than the etching rate ratio of insulating layer 20 to lower electrode layer 21.

Figure 5:
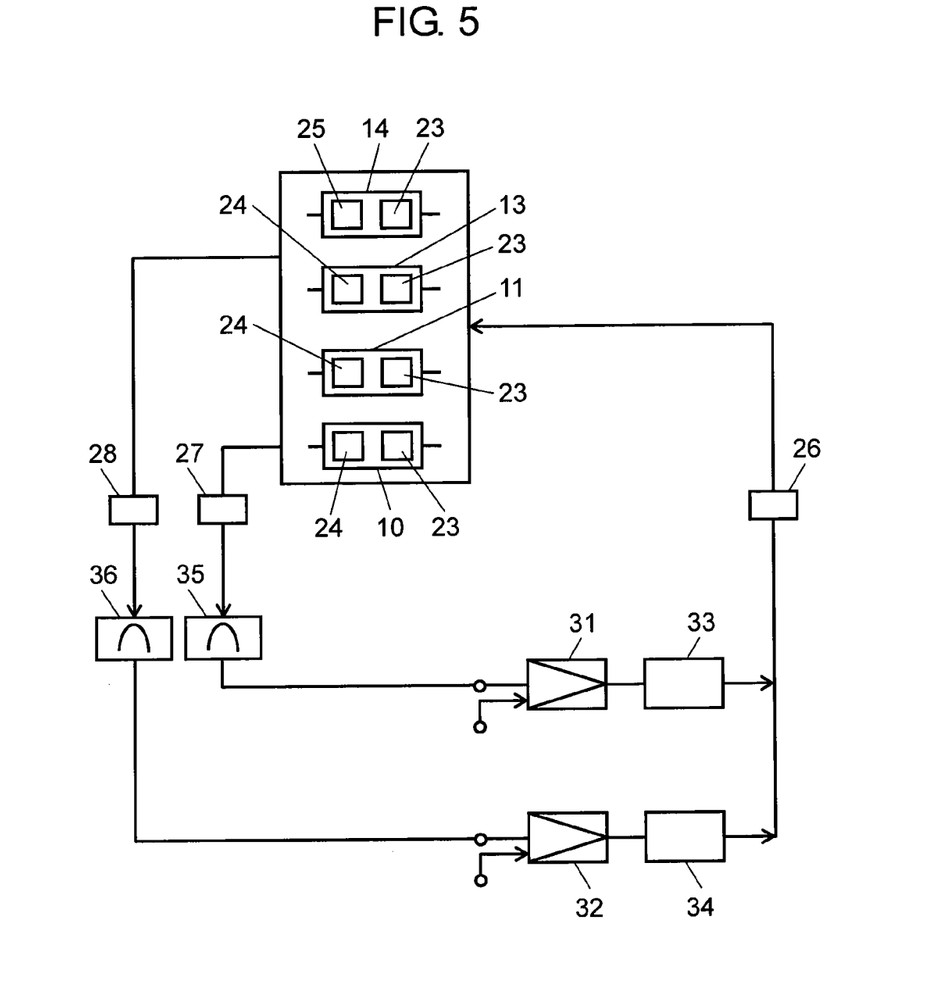
FIG. 5 is a block diagram of a driving circuit for driving the optical reflection element according to the first exemplary embodiment.

The following is a description, with reference to FIG. 5, of a method for driving optical reflection element 8 of the present exemplary embodiment. FIG. 5 is a block diagram of a driving circuit for driving the optical reflection element.

In FIG. 5, the driving circuit includes amplifiers 31 and 32 which are arranged in parallel to each other. Amplifier 31 receives and amplifies an electrical signal (an AC voltage) for driving first oscillators 10 and 11. Amplifier 32 receives and amplifies an electrical signal (an AC voltage) for driving second oscillators 13 and 14.

The electrical signal received by first oscillators 10 and 11 has an oscillation frequency unique to them, allowing first oscillators 10 and 11 to be driven resonantly. The electrical signal received by second oscillators 13 and 14 has an oscillation frequency unique to them, allowing second oscillators 13 and 14 to be driven resonantly. As a result, first oscillators 10, 11 and second oscillators 13, 14 can be driven constantly at the resonant frequency. Thus, first oscillators 10, 11 and second oscillators 13, 14 are efficiently driven and largely displaced.

The electrical signals amplified by amplifiers 31 and 32 are combined by impedance elements 33 and 34 such as resistors, and are supplied to interconnect electrode 26.

The combined electrical signal is derived from interconnect electrode 26 to upper electrode layer 23 which is shared among first and second oscillators 10, 11, 13, and 14. This results in driving drive element 16, thereby displacing first oscillators 10, 11 and second oscillators 13, 14.

Upper electrode layer 24 of monitor element 17 at the top portion of each of first oscillators 10 and 11 detects the displacement of first oscillators 10 and 11 as an electrical signal. This electrical signal is derived by interconnect electrode 27 via upper electrode layer 24 which is routed to second oscillator 13. Similarly, upper electrode layer 25 of monitor element 18 at the top portion of second oscillator 14 detects the displacement of second oscillator 14 as an electrical signal. This electrical signal is derived to interconnect electrode 28.

This electrical signal derived to interconnect electrode 27 is taken through filter 35 and is supplied again to amplifier 31.

The electrical signal derived to interconnect electrode 28 is taken through filter 36 and is supplied again to amplifier 32.

Thus, the electrical signals outputted from upper electrode layers 24 and 25 (monitor electrodes) of monitor elements 17 and 18, respectively, are fed back to upper electrode layer 23 (a drive electrode) of drive element 16 which is shared among first and second oscillators 10, 11 13, and 14. As a result, optical reflection element 8 can perform self-excited driving.

Impedance elements 33 and 34 can be reactive elements such as capacitors, coils, or a combination of them, instead of resistors.

In the present exemplary embodiment, drive element 16 shared among first and second oscillators 10, 11, 13, and 14 includes a single upper electrode layer 23 in order to apply the combined electrical signal to upper electrode layer 23. In other words, upper electrode layer 23 of drive element 16 is shared among first and second oscillators 10, 11 13, and 14. Alternatively, however, optical reflection element 8 can be driven by other circuitry. For example, it is possible to provide two upper electrode layers 23 electrically independent of each other: one in first oscillators 10 and 11, and the other in second oscillators 13 and 14.

The following is a description of the operation of optical reflection element 8 of the present exemplary embodiment.

Figure 6:
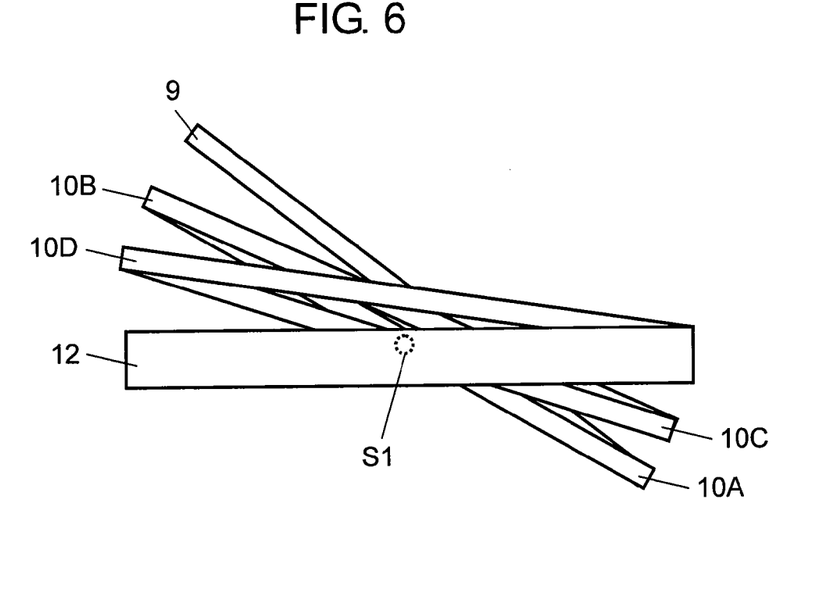
FIG. 6 is a schematic diagram of the operation of first oscillators in the optical reflection element according to the first exemplary embodiment.

In FIGS. 2A and 2B, drive element 16 is formed to have a large width on every other oscillating plate between oscillating plates 10A to 10D of first oscillator 10 and between oscillating plates 11A to 11D of first oscillating plate 11. More specifically, drive element 16 is formed to have a large width on oscillating plates 10B, 10D, 11B, and 11D. Assume that an AC voltage (an electrical signal) at the resonant frequency of first oscillators 10 and 11 is applied to upper electrode layer 23 of drive element 16. Then, oscillating plates 10B, 10D, 11B, and 11D having drive element 16 with the large width on their top portion flexurally oscillate in their thickness direction. Oscillating plates 10A, 10C, 11A, and 11C which are adjacent to oscillating plates 10B, 10D, 11B, and 11D flexurally oscillate in the opposite direction according to the principle of resonance. Thus, oscillating plates 10A to 10D and 11A to 11D oscillate in such a manner that adjacent oscillating plates are in opposite phases. Then, as shown in FIG. 6, displacement accumulates at central axis S1, allowing mirror portion 9 to repeatedly oscillate at a large amplitude about the central axis S1. Drive element 16 is formed to have a small width on oscillating plates 10A, 10C, 11A, and 11C which are adjacent to oscillating plates 10B, 10D, 11B, and 11D having drive element 16 with the large width on their top portion. Oscillating plates 10A, 10C, 11A, and 11C, to which substantially no voltage is applied, are displaced in the phase opposite to oscillating plates 10B, 10D, 11B, and 11D having drive element 16 with the large width on their top portion.

In FIGS. 3 and 4, similar to first oscillators 10 and 11, drive element 16 is formed to have a large width on every other oscillating plate between oscillating plates 13A to 13E and 14A to 14E of second oscillators 13 and 14. Assume that an AC voltage at the resonant frequency of second oscillators 13 and 14 is applied to upper electrode layer 23 of drive element 16. Then, oscillating plates 13A, 13C, 13E, 14A, 14C, and 14E having drive element 16 with the large width on their top portion flexurally oscillate in their thickness direction. Oscillating plates 13B, 13D, 14B, and 14D which are adjacent to oscillating plates 13A, 13C, 13E, 14A, 14C, and 14E flexurally oscillate in the direction opposite to oscillating plates 13A, 13C, 13E, 14A, 14C, and 14E according to the principle of resonance. Thus, oscillating plates 13A to 13E and 14A to 14E oscillate in such a manner that adjacent oscillating plates are in opposite phases. As a result, frame body 12 and mirror portion 9 can repeatedly oscillate at a large amplitude about central axis S2.

As described above, in the present exemplary embodiment, mirror portion 9 can be rotated about its center in the directions of the two axes S1 and S2.

In the present exemplary embodiment, in each of oscillating plates 10, 11, 13, and 14, drive element 16 and monitor element 17 or 18 are arranged adjacently and in parallel to each other. In each oscillating plate, the shortest conductive path between an arbitrary point of lower electrode layer 21 of monitor element 17 or 18 and an arbitrary point of lower electrode layer 21 of drive element 16 adjacent to monitor element 17 or 18 is set to be longer than the distance from the arbitrary point of lower electrode layer 21 of monitor element 17 or 18 to interconnect electrode 29. The above-mentioned shortest conductive path in the present exemplary embodiment means, for example, a path from lower electrode layer 21 of monitor element 17 or 18 to lower electrode layer 21 of drive element 16 via deriving electrode 29. To achieve this structure, in the present exemplary embodiment, the bottom surface of separation groove 30A formed between drive element 16 and monitor element 17 or 18 at the top portion of each oscillating plate is located inside insulating layer 20.

As a result, even when lower electrode layers 21 of monitor elements 17 and 18 are arranged lengthwise, the ground resistance of lower electrode layers 21 of monitor elements 17 and 18 can be relatively lower than the conductive resistance between lower electrode layers 21 of monitor elements 17, 18 and lower electrode layer 21 of drive element 16.

This reduces leakage of an electrical signal from the upper electrode of drive element 16 to upper electrode layers 24 and 25 of monitor elements 17 and 18, respectively, via lower electrode layer 21 and piezoelectric layer 22 of each of drive element 16 and monitor elements 17, 18 either between upper electrode layers 23 and 24 of drive element 16 and monitor element 17, respectively, or between upper electrode layers 23 and 25 of drive element 16 and monitor element 18, respectively.

Impedance due to capacitance decreases with increasing driving frequency, thereby increasing current leakage, which is a problem addressed by the present invention. Therefore, the structure of the present exemplary embodiment is useful to increase the detection accuracy of monitor element 17 of first oscillators 10 and 11 which are driven at a high frequency.

In the present exemplary embodiment, both in first oscillators 10, 11 and in second oscillators 13, 14, the etching is performed until the bottom surface of separation groove 30A reaches insulating layer 20. This ensures separation between lower electrode layer 21 of drive element 16 and lower electrode layer 21 of monitor element 17 or 18, thereby preventing capacitive coupling or electrical continuity between the residual portions of these lower electrode layers 21. Thus, even when lower electrode layers 21 are arranged lengthwise, it is possible to reduce current leakage between upper electrode layers 23 and 24 of drive element 16 and monitor element 17, respectively, or between upper electrode layers 23 and 25 of drive element 16 and monitor element 18, respectively. This increases the detection accuracy of monitor elements 17 and 18, allowing optical reflection element 8 to perform self-excited driving with high accuracy.

In optical reflection element 8 requiring a large amplitude, first oscillators 10, 11 and second oscillators 13, 14 may be formed in a meandering shape as in the present exemplary embodiment. In this case, the oscillators have very long beams. As a result, lower electrode layers 21 are arranged lengthwise, thereby failing to be sufficiently grounded. In the present exemplary embodiment, however, even when lower electrode layers 21 are not sufficiently grounded, it is possible to reduce current leakage between drive element 16 and monitor element 17 or 18. As a result, optical reflection element 8 of the present invention performs self-excited driving with high accuracy.

Upper electrode layer 23 of monitor element 17 of first oscillators 10 and 11 is routed to second oscillators 13 and 14. As a result, lower electrode layers 21 are arranged further lengthwise. Thus, the structure of the present exemplary embodiment is useful to realize high detection accuracy of monitor element 17 of first oscillators 10 and 11.

In the present exemplary embodiment, the bottom surface of separation groove 30A is formed of insulating layer 20. As a result, even when a conductive component adheres to the bottom surface, this does not result in electrical continuity. In addition, even when a dielectric component adheres to the bottom surface, this does not lead to capacitive coupling which causes leakage.

In the present exemplary embodiment, insulating layer 20 is made of silicon dioxide having a smaller dielectric constant than other materials often used for piezoelectric layer 22. Therefore, even when a conductive component adheres to the bottom surface of separation groove 30A, for example, during etching, this does not lead to capacitive coupling which causes leakage. In addition, even when a dielectric component adheres to the bottom surface, this does not cause noise. As a result, the detection accuracy of monitor elements 17 and 18 is increased.

In the present exemplary embodiment, upper electrode layer 23, which is the drive electrode of drive element 16 is shared among first and second oscillators 10, 11, 13, and 14. This results in the reduction of the number of wirings connected to of the electrodes routed on optical reflection element 8. As a result, production efficiency is increased, and electrical interference between the electrodes is minimized.

Figure 7:
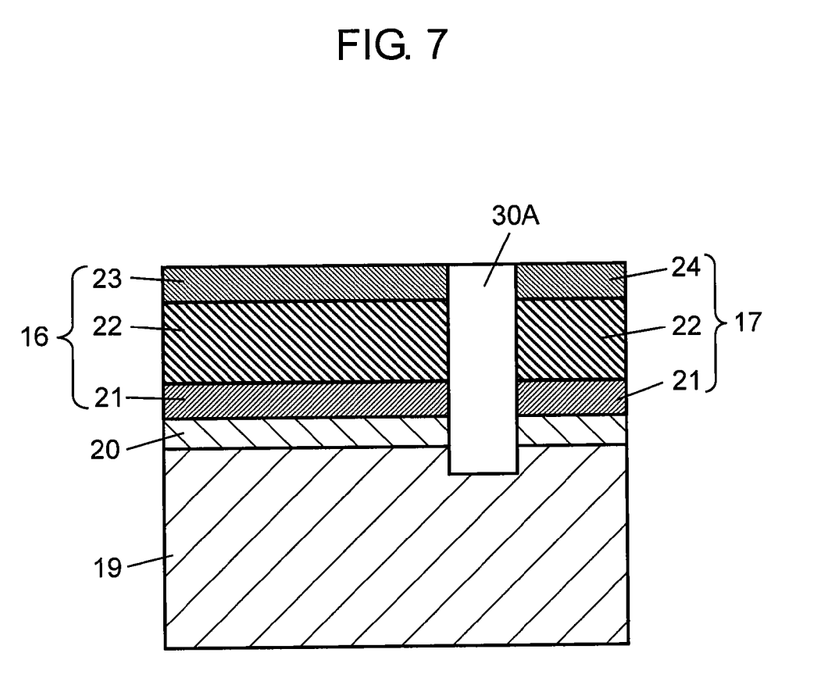
FIG. 7 is a sectional view of an essential part of another example of the optical reflection element according to the first exemplary embodiment.

Separation groove 30A is etched until its bottom surface is located inside insulating layer 20 in the present exemplary embodiment, but may alternatively be etched until its bottom surface is located inside base 19 as shown in FIG. 7. In the latter case, the dense surface of base 19 can be exposed so as to reduce adhesion of a conductive or dielectric material to the surface, thereby further reducing leakage.

Two electrical signals are combined by the impedance elements in the present exemplary embodiment, but may alternatively be combined by, for example, a preamplifier, a saturation amplifier, a band-pass filter, and an additive combiner circuit. In the latter case, the circuit is composed of active elements, allowing the above-mentioned components to be incorporated into an IC chip, thereby rationalizing the mounting process.

In first oscillators 10, 11 and second oscillators 13, 14, the use of a single upper electrode layer allows oscillating plates 10A to 10D and 11A to 11D, and oscillating plates 13A to 13E and 14A to 14E to oscillate alternately in opposite phases according to the principle of resonance. As a result, displacement accumulates, thereby reducing the number of wirings connected to electrodes, while maintaining a high oscillation efficiency.

Figure 8:
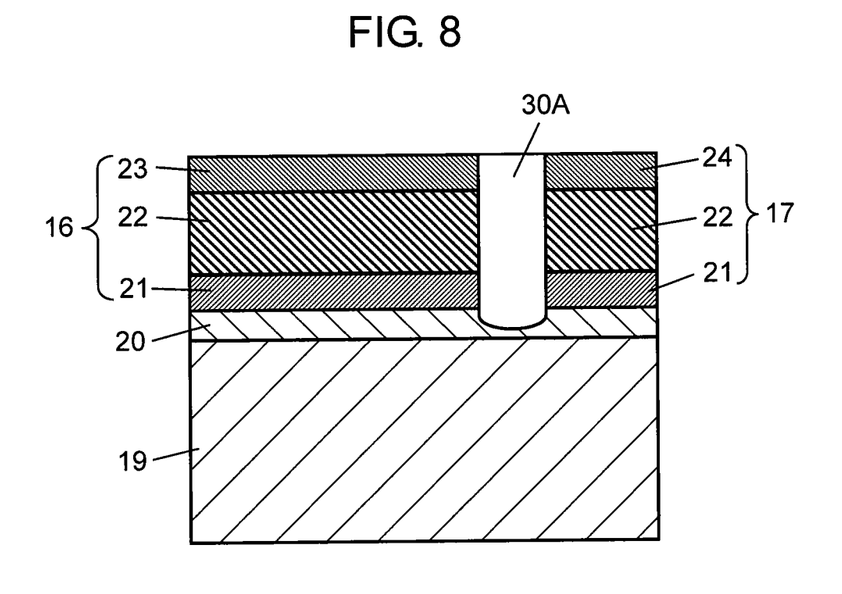
FIG. 8 is a sectional view of an essential part of further another example of the optical reflection element according to the first exemplary embodiment.

The bottom surface of separation groove 30A is made flat in the present exemplary embodiment. Alternatively, separation groove 30A may be made deeper from the periphery toward the center as shown in FIG. 8. This increases the insulation distance between lower electrode layer 21 of drive element 16 and lower electrode layer 21 of monitor element 17, thereby reducing leakage. In addition, the bottom surface in this case has a larger actual distance than the flat bottom surface. This reduces leakage between upper electrode layers 23 and 24 of drive element 16 and monitor element 17, respectively, or between upper electrode layers 23 and 25 of drive element 16 and monitor element 18, respectively, even when a conductive or dielectric component adheres to separation groove 30A.

Figure 9:
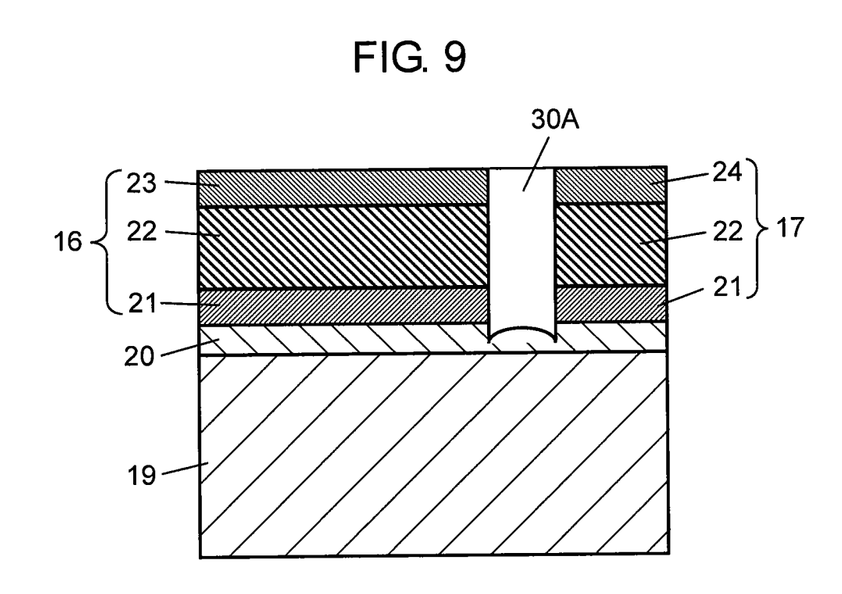
FIG. 9 is a sectional view of an essential part of further another example of the optical reflection element according to the first exemplary embodiment.

A similar effect can be obtained by making separation groove 30A deeper from the center toward the periphery as shown in FIG. 9.

Separation groove 30A is formed in each of first oscillators 10, and second oscillators 13, 14 in the present exemplary embodiment, but may alternatively be formed only in first oscillators 10 and 11. The reason for this is as follows. First oscillators 10 and 11 are further from deriving electrode 29 than second oscillators 13 and 14 are. Therefore, first oscillators 10 and 11 are more likely to cause current leakage than second oscillators 13 and 14. Forming a separation groove at least in the first oscillators can prevent current leakage, thereby increasing the detection accuracy of the monitor element.

First oscillators 10, 11 and second oscillators 13, 14 are formed in a meandering shape in the present exemplary embodiment, but may alternatively be formed in a cantilever, a crisscross, or other shapes. Optical reflection element 8 is operated in the two axial directions by coupling first oscillators 10, 11 and second oscillators 13, 14 to mirror portion 9 in the present exemplary embodiment, but may alternatively be operated in a single axial direction.

INDUSTRIAL APPLICABILITY

Optical reflection element 8 of the present invention is useful in compact image projectors such as compact projectors, head-up displays, and head-mounted displays.

The invention claimed is:

1. An optical reflection element comprising:
a mirror portion; and
an oscillator coupled to the mirror portion, the oscillator comprising:
a base;
an insulating layer formed on the base;
a drive element and a monitor element formed on the insulating layer, the drive element and the monitor element being separated from each other by a separation groove, wherein
each of the drive element and the monitor element includes a lower electrode layer, a piezoelectric layer, and an upper electrode layer formed in that order on the insulating layer;
the lower electrode layer of the drive element and the lower electrode layer of the monitor element are connected to a same external electrode layer; and
a shortest conductive path between an arbitrary point of the lower electrode layer of the monitor element and an arbitrary point of the lower electrode layer of the drive element adjacent to the monitor element is made larger than a distance from the arbitrary point of the lower electrode layer of the monitor element to the external electrode layer by the separation groove.

2. The optical reflection element of claim 1, wherein the separation groove between the drive element and the monitor element has a bottom surface located inside the insulating layer.

3. The optical reflection element of claim 1, wherein the separation groove between the drive element and the monitor element has a bottom surface located inside the base.

4. The optical reflection element of claim 3, wherein the separation groove is made deeper from an outer periphery thereof toward a center thereof.

5. The optical reflection element of claim 3, wherein the separation groove is made deeper from a center thereof toward an outer periphery thereof.

6. The optical reflection element of claim 1, wherein a thickness ratio of the insulating layer to the lower electrode layer is made larger than an etching rate ratio of the insulating layer to the lower electrode layer.

7. The optical reflection element of claim 1, wherein the oscillator is formed in a meandering shape and includes oscillating plates folded and coupled to each other on a same plane.

8. The optical reflection element of claim 2, wherein the separation groove is made deeper from an outer periphery thereof toward a center thereof.

9. The optical reflection element of claim 2, wherein the separation groove is made deeper from a center thereof toward an outer periphery thereof.

* * * * *

UNITED STATES PATENT AND TRADEMARK OFFICE
CERTIFICATE OF CORRECTION

PATENT NO. : 8,462,411 B2  Page 1 of 1
APPLICATION NO. : 13/130150
DATED : June 11, 2013
INVENTOR(S) : Hiraoka et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 217 days.

Signed and Sealed this
Eighth Day of September, 2015

Michelle K. Lee
*Director of the United States Patent and Trademark Office*